July 5, 1938.    L. M. SAMUELS    2,122,440
SCALE DUPLICATOR
Filed June 28, 1937

INVENTOR
LEO M SAMUELS
BY
*Robert A. Lavender*
ATTORNEY

UNITED STATES PATENT OFFICE 2,122,440

SCALE DUPLICATOR

Leo M. Samuels, Alexandria, Va.

Application June 28, 1937, Serial No. 150,780

4 Claims. (Cl. 33—76)

(Granted under the act of March 3, 1883, as amended April 30, 1928; 370 O. G. 757)

My invention relates to a scale duplicator and more particularly to a geometrical drafting instrument for transferring to a drawing surface a duplicate or a facsimile of a master scale.

In cartographic work it is common practice to employ a well-known, standard diagonal scale for constructing the geographic coordinates of a map or chart, the scale deriving its name from the diagonal graduations at one end thereof which enable the measurement of distances with increased accuracy. This standard diagonal scale is usually inscribed on a suitable metallic bar having straight edges to thus provide a master scale. It is the custom in the construction of charts or maps to transfer to the drawing surface a duplicate or facsimile of the master scale and then take various measurements from the scale so transcribed, thus avoiding any inaccuracies in construction that would otherwise occur because of the inevitable shrinkage or contraction of the drawing surface.

The transcription of diagonal scales to maps and charts has been accomplished heretofore by employing beam compasses, dividers and triangles for taking off intercepts from the standard or master scale. This procedure has necessarily been time consuming and tedious and required an amount of time far in excess of that employed for laying out the geographic coordinates of the map or chart.

With a view to decreasing the time necessary for duplicating the master scale, as well as obviating the tedium attendant thereto and increasing the accuracy of reproduction, I have devised the scale duplicator of the present invention. By its use a great saving in time is effected since a scale may be readily reproduced on a drawing surface from a guide or master scale in one quarter of the time required by the prior art method and with increased accuracy. Furthermore, the scale duplicator and the master scale are the only articles required for transferring the desired scale to the drawing surface, thus dispensing with any computation and the use of the various drafting instrumentalities hereinbefore described. The device of the present invention is particularly useful in the field on polyconic projections where, as a rule, scales of charts are identical with the survey equipment scales or of such ratio that the instrument may be utilized to great advantage.

Briefly, the scale duplicator of the present invention comprises a base member provided with two straight edges at right angles to each other, one of which is adapted for sliding movement along a straight edge of the master scale to be duplicated. A graduation indicator arm is associated with the base member and is so constructed that the free end thereof and the graduations of the scale to be duplicated may be juxtaposed. By successively juxtaposing the free end of the indicator arm and the various scale graduations and using the straight edge not in sliding engagement with the master scale to draw lines corresponding to each juxtaposition, the desired scale may be readily and expeditiously reproduced. When it is desired to employ the scale duplicator for producing a facsimile of a master diagonal scale as used in cartographic work, the base member is also provided with a plurality of apertures, the number and spacing of which correspond to the number and spacing of the horizontal lines forming a part of the diagonal scale, thus enabling their reproduction.

In the light of the foregoing, it is among the several objects of my invention to provide a drafting device of great simplicity by means of which a desired scale may be easily and expeditiously reproduced on a drawing surface; to provide a device for transferring to a drawing surface a duplicate or facsimile of a master scale such, for example, as employed in cartographic work; and to provide a device of the character described wherein the graduation indicator arm is so arranged that the free end thereof may be accommodated to scales of varying thickness that are to be duplicated.

Other objects and many of the attendant advantages of this invention will be readily appreciated as the same becomes better understood by reference to the following detailed description when considered in connection with the accompanying sheet of drawings, wherein.

While in the descriptive matter that will now follow the scale duplicator is described for illustrative purposes as used in the production of a facsimile of a master diagonal scale such as is used in cartographic work, I wish it to be clearly understood that the duplicator is not to be limited to this use. It should be at once evident to those skilled in the art that the duplicator of the present invention may be used for duplicating any linear scale; and that by slight modification it may be employed in reproducing facsimiles of other scales.

Figure 1:
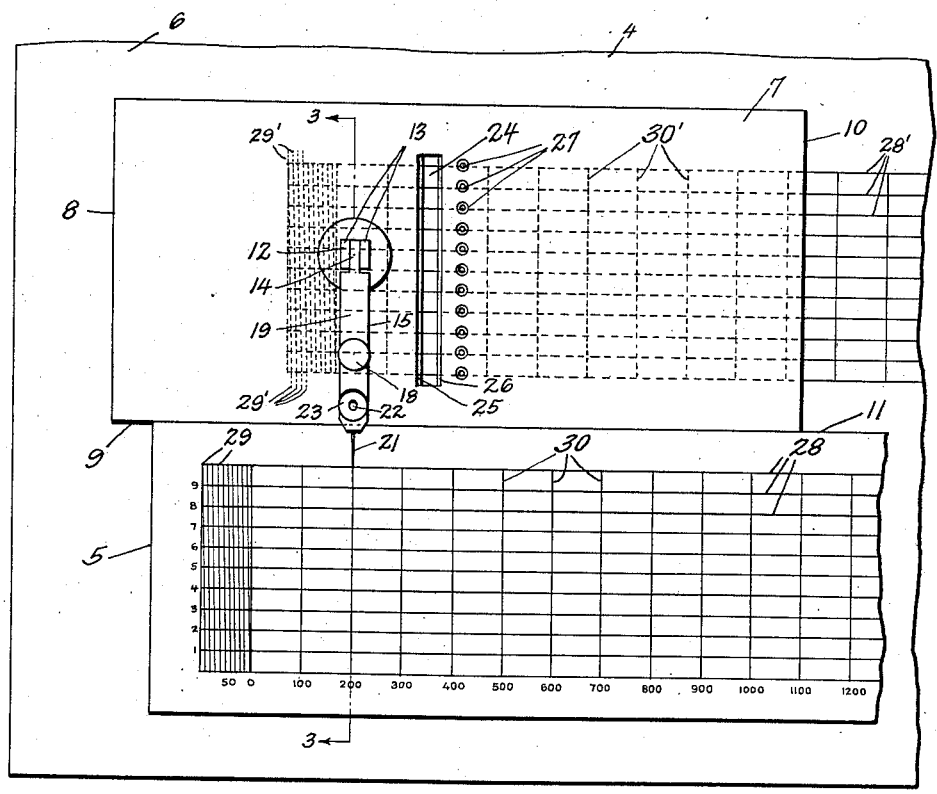
Fig. 1 is a plan view of the scale duplicator which is shown for illustrative purposes on a drawing surface and in sliding engagement with a master scale, a facsimile of which has been reproduced.
Figure 2:
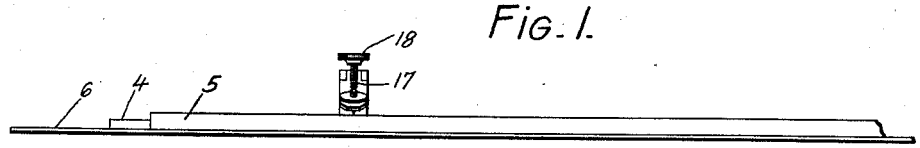
Fig. 2 is a view in side elevation of the assembly of Fig. 1 as seen from the free end of the graduation indicator arm.
Figure 3:
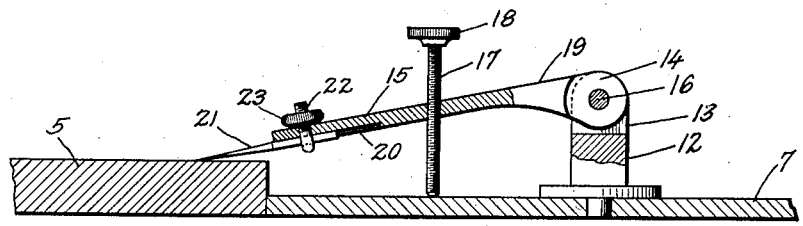
Fig. 3 is a cross sectional view of the scale duplicator and master scale taken on the line 3—3 of Fig. 1, all parts being shown on an enlarged scale so that certain of the constructional features of the duplicator may be clearly understood.

Turning now to the drawing, there is shown in Fig. 1 thereof the scale duplicator identified in general by the reference character 4 in a position to duplicate the master diagonal scale 5 on a drawing surface 6. The duplicator 4 includes the rectangular base member 7, the edges 8, 9 and 10 of which are straight edges and is preferably fabricated from any suitable transparent material known to the prior art. The edge 9 of the duplicator is adapted for sliding movement along the straight edge 11 of the master scale 5 to be duplicated.

A pedestal 12 is rigidly secured to the base member 7 in any suitable manner and has the upper end thereof provided with a bifurcation 13 to receive the shank 14 of the graduation indicator arm identified in general by the reference character 15. A screw 16 extends through the shank 14 of the arm 15 and the bifurcation 13 of the pedestal 12 to thus provide a pivotal mounting for the graduation indicator arm 15. The screw threads are preferably of such extent that by proper adjustment of the screw 16 a slight frictional engagement between the shank 14 and bifurcation 13 is insured to thus facilitate the maintenance of the arm 15 in any of its positions of pivotal adjustment. For adjusting the indicator arm 15 about its point of pivotal support there is provided the vertical screw 17 having the knurled head 18 and threadedly engaging the arm 15 in the manner shown. By suitable adjustment of the screw 17 it is evident that the arm may be pivoted to a desired position to thus accommodate the free end thereof to master scales of varying thickness.

The arm 15 is also adjustable in length and comprises the part 19 which is grooved at 20 to receive the needlepoint or stylus 21. The stylus 21 as shown passes through an aperture in one end of a threaded stud 22, the other end of the stud threadedly engaging a knurled circular nut 23. By this arrangement the arm 15 is rendered adjustable in length so that the free or stylus end thereof and the graduations of the scale to be duplicated may be juxtaposed. After the arm 15 has been adjusted to proper length by loosening the nut 23, the nut is then tightened thus insuring a secure and frictional engagement between the stylus 21 and the part 19.

The base member 7 as shown in Fig. 1 is provided with a rectangular slot 24, the sides 25 and 26 of which are beveled to form straight edges which serve as pencil guides. The straight edges 25 and 26, like straight edges 8 and 10, are at right angles to the straight edge 9 which slidably engages the edge 11 of the master scale 5 to be duplicated. Any one of the straight edges 8, 10, 25 or 26 may be used in duplicating a graduation of the master scale, it being only necessary to use the same straight edge selected during the duplicating process. The base member 7 is also provided with a plurality of apertures 27, the number and spacing of which correspond to the number and spacing of the horizontal lines of the master diagonal scale 5. Each of the apertures is beveled or chamfered at its edge to facilitate the insertion of a sharp pointed pencil.

If it is now desired to duplicate the master diagonal scale 5 on a map or chart 6 the scale duplicator is placed with its straight edge 9 against the straight edge 11 of the master scale 5 and with a pencil successively inserted in the apertures 27 the duplicator is slid along the entire length of the master scale 5 thus reproducing with the pencil the eleven long horizontal lines 28' corresponding to those numbered 28 on the master scale. The indicator arm 15 is then pivotally adjusted by manipulation of the screw 17 and its length fixed such that the stylus or needle-point 21 may travel along and make intimate contact with the upper divisions or graduations of the master scale. After this initial adjustment, the stylus 21 is caused to make intimate contact with each of the eleven graduations 29 at the left end of the master scale 5; and for each of these graduations, assuming that the straight edge 26 has been selected, small dashes 29' are drawn across the top and bottom long horizontal lines 28'. The vertical intercepts 30 of the master scale are transferred and drawn directly upon the surface 6 as lines 30' by contacting the stylus point 21 with the uppermost graduations of the master scale 5 and using the straight edge 26 of the slot 24 for a pencil guide in the same manner as it was employed in drawing the dashes 29' corresponding to the graduations 29. As a final step in completing the facsimile of the master scale 5 the proper points of intersection of the dashes 29' with the top and bottom horizontal lines 28' are connected in the manner shown by using one of the straight edges of the duplicator 4, thus forming the diagonal portion of the master scale described hereinbefore.

According to the provisions of the patent statutes I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. A device for duplicating scales comprising in combination a member provided with a straight edge adapted for sliding movement along a straight edge of the scale to be duplicated, a graduation indicator arm pivotally associated with said member, means operable to adjust the indicator arm about its point of pivotal support whereby the free end of the arm may be accommodated to scales of varying thickness that are to be duplicated, said arm being also adjustable in length so that the free end thereof and the graduations of the scale to be duplicated may be juxtaposed, the aforesaid member being provided with a slot at least one side of which is formed as a straight edge at right angles to the first mentioned straight edge to thus enable the duplication of certain scale portions as the free end of the indicator arm and various scale graduations are successively juxtaposed, said member being also provided with a plurality of apertures the number and spacing of which are determined by the scale under consideration whereby the remaining portions of the scale may be duplicated.

2. A device for duplicating scales comprising in combination a member provided with a straight edge adapted for sliding movement along a straight edge of the scale to be duplicated, a graduation indicator arm associated with said member and adjustable in length so that the free end thereof and the graduations of the scale to be duplicated may be juxtaposed, the aforesaid member being provided with a slot at least one side of which is formed as a straight edge at right angles to the first mentioned straight edge to thus enable the duplication of certain scale portions as the free end of the indicator arm and various scale graduations are successively juxtaposed, said member being also provided with a plurality of apertures the number and spacing of which are determined by the scale under consideration whereby the remaining portions of the scale may be duplicated.

3. A device for duplicating scales comprising in combination a member provided with two straight edges at right angles to each other one of which is adapted for sliding movement along a straight edge of the scale to be duplicated, a graduation indicator arm associated with said member and arranged such that the free end thereof and the graduations of the scale to be duplicated may be juxtaposed, said member being provided with a plurality of apertures the number and spacing of which are determined by the scale to be duplicated.

4. A device for duplicating scales comprising in combination a member provided with two straight edges at right angles to each other one of which is adapted for sliding movement along a straight edge of the scale to be duplicated, and a graduation indicator arm associated with said member and arranged such that the free end thereof and the graduations of the scale to be duplicated may be juxtaposed, said indicator arm being pivotally mounted whereby the free end of the arm may be accommodated to scales of varying thickness that are to be duplicated, and said member being provided with a plurality of apertures the number and spacing of which are determined by the scale to be duplicated.

LEO M. SAMUELS.